United States Patent
Fournier et al.

(10) Patent No.: US 6,193,145 B1
(45) Date of Patent: Feb. 27, 2001

(54) METHOD FOR JOINING TWO PARTS OF DIFFERENT KINDS BY HETEROGENEOUS BUTT WELDING, AND USES THEREOF

(75) Inventors: Yves Fournier, Chatenoy le Royal; Alain Peigney, S'Loup de Varennes; Léon Dunand-Roux, Chatenoy le Royal, all of (FR)

(73) Assignee: Framatome, Courbevoie (FR)

( * ) Notice: Subject to any disclaimer, the term of this patent is extended or adjusted under 35 U.S.C. 154(b) by 0 days.

(21) Appl. No.: 09/091,673

(22) PCT Filed: Nov. 20, 1996

(86) PCT No.: PCT/FR96/01839

§ 371 Date: Jan. 8, 1999

§ 102(e) Date: Jan. 8, 1999

(87) PCT Pub. No.: WO97/22433

PCT Pub. Date: Jun. 26, 1997

(30) Foreign Application Priority Data

Dec. 18, 1995 (FR) .................................................. 95 14990

(51) Int. Cl.$^7$ ............................ B23K 20/16; B23K 35/12; B23K 9/00

(52) U.S. Cl. .................. 228/262.41; 228/250; 228/119; 228/125; 219/137 R; 219/137 WM

(58) Field of Search ..................................... 228/250, 253, 228/263.15, 226, 125, 262.41; 420/453; 219/137; 29/506; 75/302

(56) References Cited

U.S. PATENT DOCUMENTS

| | | | | |
|---|---|---|---|---|
| 2,156,298 | * | 5/1939 | Leitner et al. | 113/112 |
| 3,239,929 | * | 3/1966 | Ellis et al. | 29/504 |
| 3,693,245 | * | 9/1972 | De Cadenet | 29/504 |
| 3,770,427 | * | 11/1973 | Petersen | 75/171 |
| 3,805,372 | * | 4/1974 | Wagenknecht | 29/481 |
| 3,919,519 | * | 11/1975 | Petersen | 219/137 |
| 3,975,612 | * | 8/1976 | Nkazaki et al. | 219/121 |
| 4,013,868 | * | 3/1977 | Koshiga et al. | 219/137 WM |
| 4,213,026 | * | 7/1980 | Duvall et al. | 219/75 |
| 4,227,925 | * | 10/1980 | Hosoi et al. | 75/171 |
| 4,234,119 | * | 11/1980 | Masaoka et al. | 228/125 |
| 4,254,322 | * | 3/1981 | Asano | 219/122 |
| 4,336,441 | * | 6/1982 | Godai et al. | 219/137 |
| 4,348,131 | * | 9/1982 | Shimanki et al. | 403/272 |

(List continued on next page.)

FOREIGN PATENT DOCUMENTS 0 668 120    8/1995   (EP) ................................ B23K/9/23

OTHER PUBLICATIONS

Takano, G., et al., "Welding of Stainless Steel in Nuclear Energy Industry," vol. 36, Jun. 1995, Oxford GG,GB, pp. 193–200.*

Allegheny Ludlum Steel Corporation, Stainless Steel Handbook, pp. 13–15, 18–24, and 44, 1959.*

Allegheny Ludlum Steel Corporation, Stainless Steel Handbook, pp. 13–15, 18–24, and 44, 1959.*

Patent Abstracts of Japan, vol. 14, No. 491 (M–1040) Oct. 25, 1990.

Primary Examiner—Patrick Ryan
Assistant Examiner—L. Edmondson
(74) Attorney, Agent, or Firm—Pollock, Vande Sande & Amernick, R.L.L.P.

(57) ABSTRACT

An end portion of each of two parts is machined and the machined end portion of the parts are arranged in facing positions to form a welding bevel extending in a longitudinal direction between the parts, whereafter a filler metal is deposited into the welding bevel. The welding bevel is a narrow bevel with side walls at an aperture angle of no more than 5° relative to the longitudinal central plane of the bevel. A nickel alloy comprising 18–32% of chromium is deposited into the welding bevel. The method is particularly suitable for joining a pressurized water nuclear reactor vessel tubing and an austenitic stainless steel primary circuit pipe.

8 Claims, 3 Drawing Sheets

U.S. PATENT DOCUMENTS

| | | | | |
|---|---|---|---|---|
| 4,424,436 | * | 1/1984 | Humberstone | 219/137 R |
| 4,436,554 | * | 3/1984 | Omae et al. | 75/128 |
| 4,653,684 | * | 3/1987 | Saito et al. | 228/263.15 |
| 4,896,814 | * | 1/1990 | Allain et al. | 228/119 |
| 4,962,586 | * | 10/1990 | Clark et al. | 29/889.2 |
| 5,347,098 | * | 9/1994 | Murakami et al. | 219/61 |
| 5,368,223 | * | 11/1994 | Chevrel et al. | 228/214 |
| 5,532,454 | * | 7/1996 | Kuhnen | 219/137 R |
| 5,556,561 | * | 9/1996 | Ishikawa et al. | 219/137 |
| 5,628,449 | * | 5/1997 | Onuma et al. | 228/262.41 |
| 5,670,072 | * | 9/1997 | Offer et al. | 219/137 R |
| 5,688,419 | * | 11/1997 | Offer | 219/137 R |
| 6,042,782 | * | 3/2000 | Murata et al. | 420/109 |
| 6,080,960 | * | 6/2000 | Fournier et al. | 219/137 WM |

* cited by examiner

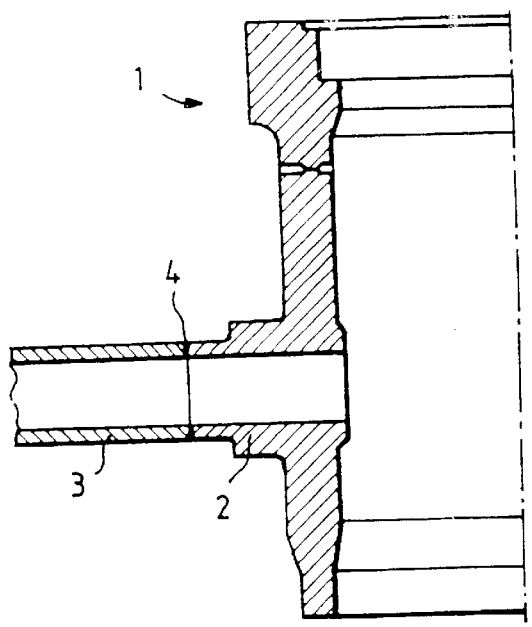
FIG.1
FIG.2
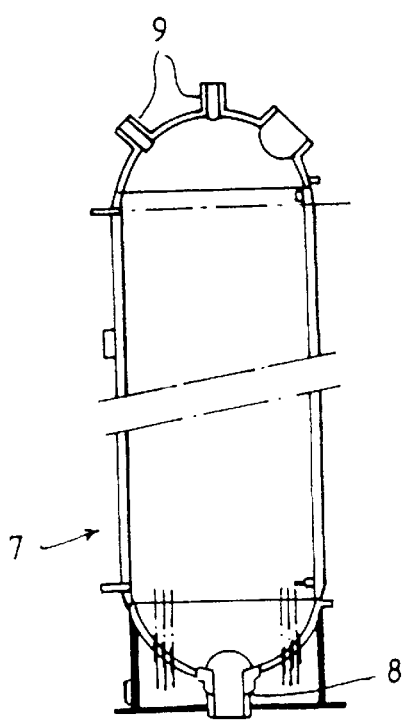
FIG.3

METHOD FOR JOINING TWO PARTS OF DIFFERENT KINDS BY HETEROGENEOUS BUTT WELDING, AND USES THEREOF

FIELD OF THE INVENTION

The invention concerns a method of jointing a first part made of low alloy constructional steel and a second part made of austenitic stainless steel by heterogeneous butt-welding.

BACKGROUND OF THE INVENTION

Nuclear reactors in general and pressurised water nuclear reactors in particular include components such as the reactor containment vessel, steam generators and the pressuriser which are made of low alloy high strength constructional steel lined with a layer of stainless steel and connected by one or more connecting tubes to one or more austenitic stainless steel pipes constituting parts of the primary circuit of the reactor, for example.

The containment vessel of a nuclear reactor is generally cylindrical and has a guide tube for supporting connecting tubes in which is formed a set of connecting tubes for connecting the containment vessel to the pipes of the various loops of the primary circuit.

Steam generators of pressurised water nuclear reactors include a water box having a hemispherical wall constituting the lower part of the steam generator with two connecting tubes welded to two pipes of the primary circuit of the reactor.

The pressuriser of a pressurised water nuclear reactor includes a generally cylindrical jacket having two domed ends, the bottom end having a connecting tube for connection to the primary circuit of the nuclear reactor via an austenitic stainless steel expansion pipe, the top end being connected in the same manner to other austenitic stainless steel pipes.

In all cases the connecting tubes of the component, which are made of constructional steel lined with stainless steel, must be butt-welded to an austenitic stainless steel pipe.

SUMMARY OF THE INVENTION

It is therefore necessary to make a heterogeneous welded joint between the connecting tube and the pipe, the heterogeneous weld being effected by depositing a filler metal into a groove formed between the connecting tube and the pipe or between the connecting tube and an intermediate austenitic stainless steel connector.

Before effecting the heterogeneous weld between the connecting tube and the pipe or the intermediate connector it is necessary to deposit a thick layer of stainless steel or nickel alloy onto an end part of the connecting tube constituting one surface delimiting the groove into which the filler metal is deposited during welding.

If the welding if effected by depositing nickel alloy in the groove, a thick layer of nickel alloy is deposited on both the lateral surfaces delimiting the groove, i.e. the machined surface on the connecting tube and the machined surface on the stainless steel pipe.

Using nickel alloy as the filler metal results in welded joints of improved mechanical characteristics.

However, if the filler metal is a nickel alloy it is more difficult to weld and to inspect after welding than if the filler metal is a stainless steel, for example of the 316 L type. Nickel alloys oxidise more and are more sensitive to hot cracking than 316 L stainless steel.

BRIEF DESCRIPTION OF THE INVENTION

Furthermore, because there is a great difference between the degree to which the ferritic steel of the connecting tube and the filler metal absorb gamma rays, radiographic inspection of the weld is difficult.

The operations preceding welding, i.e. machining the groove and applying the thick layer of nickel alloy (or stainless steel), increase the time required to make the joint and lead to high costs.

Finally, some defects have been detected in the heterogeneous welded areas, although these defects do not compromise the safety of the welded joints.

The aim of the invention is therefore to propose a method of jointing by heterogeneous butt welding a first part made from a low alloy constructional steel and a second part made from austenitic stainless steel, consisting in machining an end portion of each of the parts, placing the machined end portions of the parts face-to-face to constitute a welding groove extending in a longitudinal direction between the parts and depositing a filler metal into the welding groove, this method limiting the duration and cost of the jointing operations, in particular application of the thick layer of nickel alloy (or stainless steel) to the welding groove walls before welding.

To this end, the welding groove is a narrow groove in which the angle of opening of the lateral walls parallel to the longitudinal direction and consisting of machined portions of the two parts to a median plane of the groove in the longitudinal direction is at most equal to 5° and there is deposited into the welding groove a nickel-based alloy containing by weight 18% to 32% chromium and possibly iron, manganese, silicon, molybdenum, aluminium, copper, niobium and titanium, the remainder of the alloy, with the exception of impurities resulting from its manufacture, comprising nickel constituting at least 53% by weight.

For a better understanding of the invention one embodiment of the method in accordance with the invention and its application to the construction and repair of nuclear reactors will now be described by way of non-limiting example with reference to the accompanying drawings.

FIG. 1 is a half-view in section of part of the containment vessel of a nuclear reactor showing a connecting tube for connecting the containment vessel to the primary circuit and part of a primary circuit pipe.

FIG. 2 is an elevation view partly in section of the lower part of a steam generator of a pressurised water nuclear reactor.

FIG. 3 is a view in section on a vertical plane of a pressuriser of a pressurised water nuclear reactor.

DESCRIPTION OF PREFERRED EMBODIMENT

Figure 4:
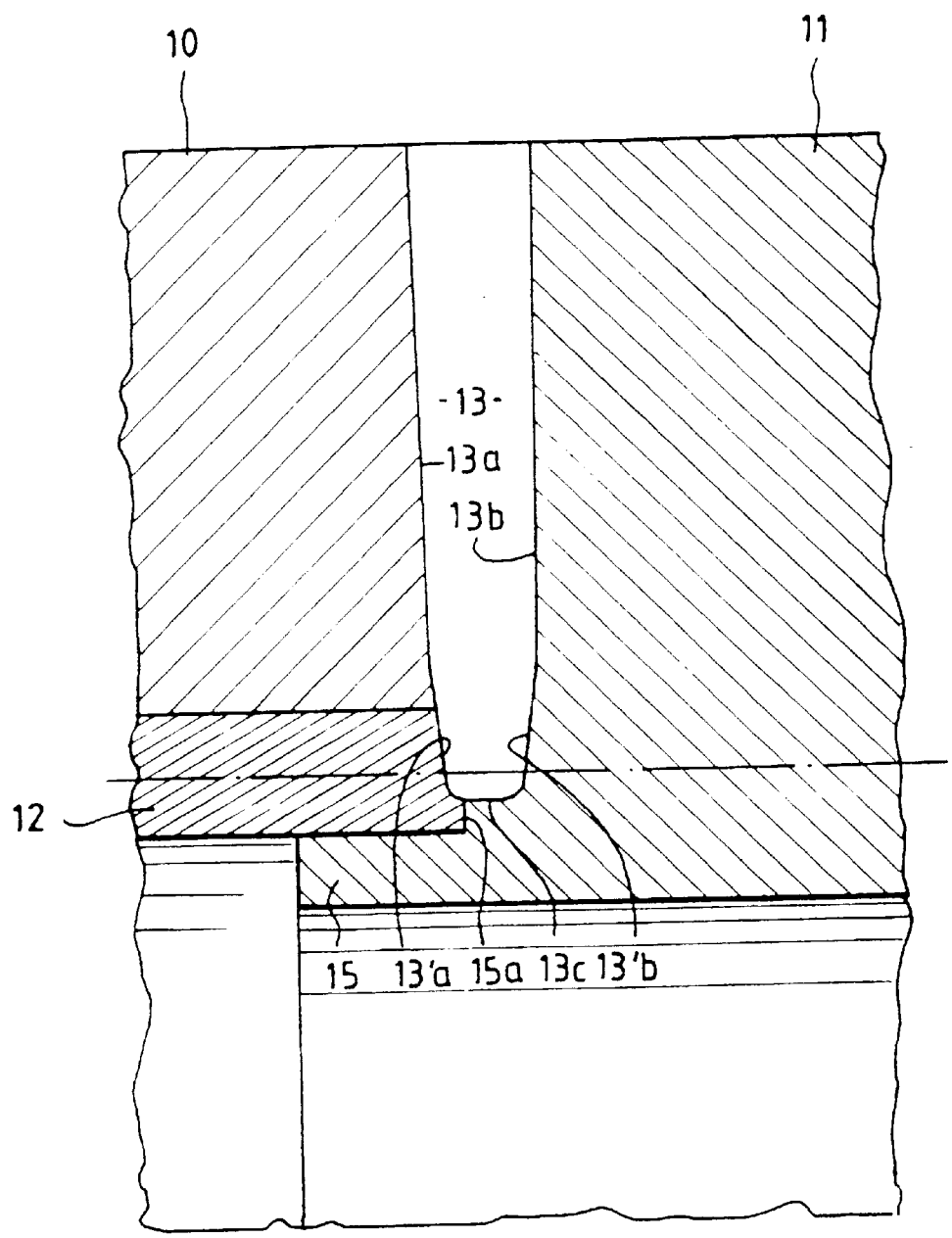
FIG. 4 is a half-view in section to a larger scale of the jointed parts of a ferritic steel connecting tube and an austenitic steel pipe, delimiting between them a narrow welding groove for use of the jointing process in accordance with the invention.

FIG. 1 shows part of the top of the containment vessel 1 of a pressurised water nuclear reactor including a connecting tube 2 for connecting the containment vessel to an austenitic stainless steel pipe 3 of the primary circuit. The containment vessel 1 of the nuclear reactor is made of low alloy constructional steel referred to hereinafter as "ferritic" steel. The ferritic steel connecting tube 2 is butt-jointed by a weld 4 to the austenitic stainless steel primary circuit pipe 3. The weld 4 is therefore a heterogeneous weld. The pipe 3 can be jointed to the connecting tube 2 by means of a heterogeneous weld 4 using the method of the invention.

FIG. 2 shows the bottom part of a steam generator 5 of a pressurised water nuclear reactor that includes a water box delimited by a spherical wall having connecting tubes like the connecting tube 6 for connecting a pipe of the primary circuit of the reactor to the water box of the steam generator. The water box of the steam generator includes two compartments each of which is provided with a connecting tube for connecting it to a primary circuit pipe. The steam generator 5 is made of low alloy constructional steel and so the austenitic stainless steel primary circuit pipes must be connected to the connecting tubes of the steam generator, such as the connecting tube 6, by means of a heterogeneous weld. This jointing can be done using the method of the invention.

FIG. 3 shows a pressuriser 7 of a pressurised water nuclear reactor which has in its lower part a connecting tube 8 for connecting it to an expansion line through which the pressure in the primary circuit of the nuclear reactor is adjusted.

The jacket of the pressuriser 7 and the connecting tube 8 are made of low alloy constructional steel, known as ferritic steel, and the expansion line is made of austenitic stainless steel. The joint is therefore effected by means of a heterogeneous weld and can be effected using the method of the invention. The pressuriser 7 has at its upper end connecting tubes 9 for connecting it to a discharge line and to a sprinkler line, both of austenitic stainless steel. The connecting tubes 9 of the pressuriser can be jointed to the corresponding lines by the method of the invention.

FIG. 4 shows an end part of a ferritic steel connecting tube 10 of a pressurised water nuclear reactor containment vessel and an end part of an austenitic stainless steel pipe 11 of the primary circuit of the nuclear reactor which is to be jointed to the connecting tube 10, in a relative disposition identical to that of connecting tube 2 and the primary pipe 3 of the containment vessel 1 shown in FIG. 1. In this relative disposition the ferritic steel connecting tube 10 and the austenitic stainless steel pipe 11 are arranged coaxially and end-to-end.

The connecting tube 10 has on its inside surface a coating layer 12 of stainless steel which is in contact with the primary fluid when the nuclear reactor is in service.

The end parts of the connecting tube 10 and the pipe 11 are machined and then abutted together to delimit a narrow groove 13. The end parts of the connecting tube 10 and the pipe 11 are machined so that the groove 13 has two opposite lateral walls 13a, 13b that are practically parallel to each other and perpendicular to the axis common to the connecting tube 10 and the pipe 11. In reality the plane walls 13a and 13b are at an angle close to 1° to a plane perpendicular to the axis common to the connecting tube 10 and the pipe 11 in aligned positions.

The bottom of the groove 13 towards the inside of the connecting tube and the pipe coming into contact with the primary fluid which is delimited by machined inclined surfaces in the connecting tube 10 and in its stainless steel coating 12 and in the stainless steel pipe 11 has walls 13'a and 13'b at a small angle, in the order of 4°, to a plane perpendicular to the axis common to the connecting tube 10 and the pipe 11. The groove 13 has a cylindrical bottom 13c the axis of which is coincident with the axis common to the connecting tube 10 and the pipe 11. The opening of the groove 13 in the direction towards the axis of the connecting tube 10 and the pipe 11 varies between approximately 11 mm in the bottom part and approximately 14 mm in the top part.

More generally, the parameter defining the geometry of the groove is the angle of the side walls of the groove, i.e. the angle of the side walls machined on the parts to be jointed, to a median plane of the groove in the longitudinal direction, relative to which the groove is substantially symmetrical. In the case of a narrow groove, the angle is less than 5° over all of the height of the groove, according to the thickness of the parts to be jointed.

For using the invention it is preferable for the narrow groove to have a maximal opening the axial direction, or more generally a maximal width in a direction perpendicular to the longitudinal direction and to the lateral faces of the groove, in the order of 15 mm.

However, the maximal width of the opening of the groove can vary with the thickness of the parts to be welded.

The inside end part of the austenitic stainless steel pipe 11 is machined to form an annular bearing heelpiece 15 enabling the pipe 11 to be fitted to the end part of the connecting tube so that the stainless coating layer 12 abuts against a shoulder 15a machined on the end part of the pipe 11 to close the bottom of the groove 13.

The walls of the narrow groove used in the context of the invention are generally practically parallel over the greater part of their length in the radial direction. The walls delimiting the narrow groove are at an angle to the median plane of the groove perpendicular to the axis common to the connecting tube and the pipe to be jointed by welding that does not exceed 5°.

The maximal opening of the narrow groove in the axial direction is in the order of 15 mm.

In all cases, the joint between the ferritic steel tubular part and the austenitic steel tubular part is effected by welding with no previous deposition of nickel alloy (or stainless steel) on the end walls delimiting the groove.

Figure 5:
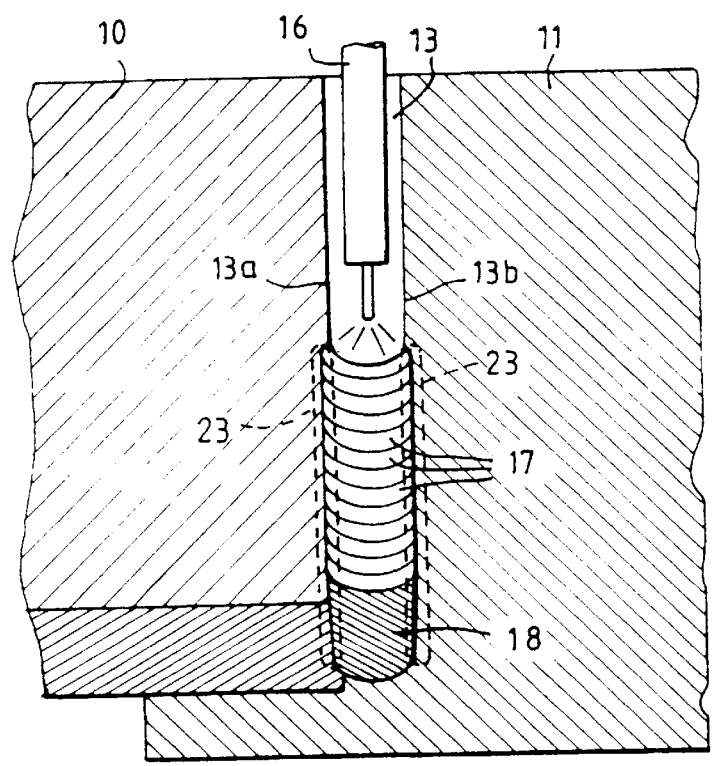
FIG. 5 is a view in section similar to the FIG. 4 view showing the welding groove during its filling with the filler metal in use of the jointing method in accordance with the invention.

FIG. 5 shows the connecting tube 10 and the stainless steel pipe 11 delimiting between them the groove 13 into which filler metal is deposited by means of a welding torch 16.

A TIG (Tungsten Inert Gas) welding torch is generally used with the parts to be welded rotating in front of the fixed welding torch.

The electrode of the welding torch 16 melts a filler metal wire to deposit successive layers 17 into the groove 13, each successive layer 17 being formed during a welding pass in which the parts rotate once about the common axis of the connecting tube 10 and the pipe 11.

It is not necessary to deposit juxtaposed weld beads in a plurality of successive passes to form the layers 17. The limited width of the groove enables the deposition of a continuous layer 17 making the joint between the two faces 13a and 13b of the groove. The jointed areas of the parts 10 and 11 in the vicinity of the lateral faces of the groove are not melted directly by the welding torch but only by thermal conduction between the filler metal deposited in liquid form and the metal of the parts, which assures a joint between the jointed areas of the parts and the filler metal with a low dilution in the jointed areas of the parts.

The first welding passes in the bottom of the groove 13, i.e. on the interior side of the connecting tube and the pipe, are effected by depositing a filler metal 18 consisting of a first nickel alloy containing (by weight) less than 0.04% carbon, less than 0.015% sulphur and less than 0.015% phosphorus, 28% to 31.5% chromium, less than 0.50% molybdenum, less than 1.10% aluminium, less than 0.30% copper, less than 1% titanium, possibly 7% to 12% iron, the remainder of the alloy essentially consisting of nickel.

Instead of nickel alloy, a low carbon 316 L stainless steel containing 17% chromium and 12% nickel can be deposited in the bottom of the groove 13 to constitute the filler metal root 18.

Filling of the narrow groove 13 is completed by depositing the second nickel alloy containing less than 0.10% carbon, 18% to 22% chromium, less than 0.50% copper, possibly 2% to 3% niobium, less than 0.75% titanium and less than 3% iron and 2.50% to 3.50% manganese, less than 0.030% phosphorus, less than 0.015% sulphur and less than 0.50% silicon, the remainder essentially consisting of nickel representing more than 67% by weight.

The filler metal is deposited in successive layers 17 until the groove is filled completely.

Each of the layers of filler metal like the layer 17 represented in FIG. 5 consists of a single weld bead deposited in liquid form in the groove. The edges of the parts 10 and 11 which are not melted by the electric arc produced by the welding electrode 16 fuse in an area of limited thickness because of contact with the deposited liquid metal. The areas 23 (shown in dashed line in FIG. 5) in which the base compositions are diluted are thin. The welded joint has homogeneous mechanical characteristics and the risk of cracking in the weld area is very low.

Figure 6:
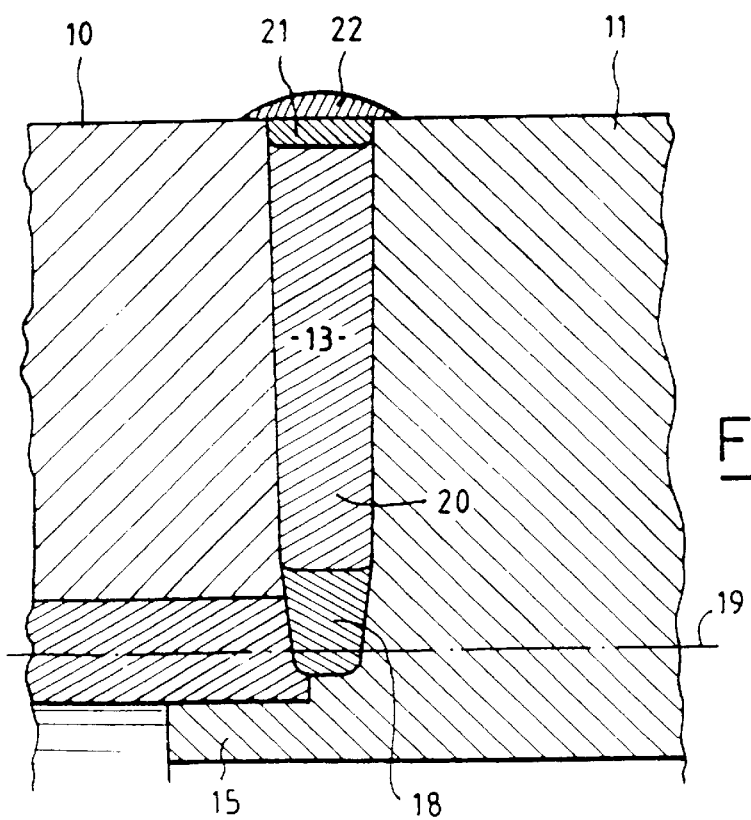
FIG. 6 is a half-view in section of the jointed parts of a pipe and a connecting tube similar to the FIG. 4 and 5 views, showing the welding groove filled with the filler metal after the welding operation.

As shown in FIGS. 5 and 6, the welded joint includes a root part filled with the filler metal 18 consisting of the first nickel alloy or stainless steel.

After the connecting tube 10 and the pipe 11 have been jointed by means of the welded joint filling the narrow groove 13, the inside surface of the tubular parts is machined (shaved) down to the cylindrical inside surface 19 to eliminate the support heel piece 15 on the pipe 11 and to obtain a smooth inside surface in the jointed area of the tubular parts 10 and 11. After machining the metal 18 at the root of the welded joint consisting of the first nickel alloy or the 316 L stainless steel is visible on the inside surface of the tubular parts which comes into contact with the primary fluid of the nuclear reactor.

The first nickel alloy and the 316 L stainless steel are known for their corrosion resistance and in particular for their resistance to stress corrosion in contact with the primary water of the reactor which is at a high temperature and a high pressure.

The second nickel alloy which constitutes the main filling area 20 of the groove obtained by automatic welding and also the end of filling area 21 and the finish area 22 projecting slightly from the outside surface of the tubular parts is not in contact with the primary fluid and therefore is not subject to stress corrosion in the reactor when in service.

It is also possible to make a welded joint entirely with the first nickel alloy resistant to stress corrosion by depositing this alloy both in the root part of the narrow groove and in the main filling part towards the outside of the groove.

It is equally possible to use one or more nickel alloys other than the first alloy and the second alloy; these nickel alloys generally contain 18% to 32% by weight chromium and at least 53% by weight nickel. These alloys can contain iron, molybdenum, aluminium; copper, niobium and titanium in addition to chromium and nickel.

A chromium content of at least 18% is necessary to assure acceptable corrosion resistance of the alloy and the chromium content must be less than 32% to obtain a purely austenitic structure of the deposited metal and to avoid the appearance of intermetallic precipitates.

If the nickel alloy is also used to fill the root of the groove, on the primary side, the chromium content must be in the upper part of the range, in the range 25% to 32% by weight.

The carbon content of the alloy must in all cases be less than 0.10% and preferably less than 0.05% if the nickel alloy is used to fill the root of the bevel on the primary side.

The process of the invention can be used to joint two parts one of which is made of low alloy constructional steel and the other of which is made of austenitic steel without any preliminary deposition of a thick layer of alloy or steel on the end portions of the tubular parts to be jointed.

The welded joint obtained by the process of the invention inside a narrow groove is free of defects and by using appropriate nickel alloys it is possible to obtain a joint having very good mechanical properties and which is resistant to stress corrosion.

The method of the invention is not limited to the embodiments that have been described.

The method can be used to weld parts that are not of tubular shape, for example flat parts. In the case of tubular parts that are butt-jointed, the longitudinal direction of the groove is a circumferential direction of the parts; the lateral walls of the parts are at a small angle to a plane perpendicular to the axis common to the two parts relative to which the lateral walls of the groove are substantially symmetrical. In the case of flat parts the groove can be in a longitudinal direction of the parts which is rectilinear; the lateral walls of the groove are at a small angle to a median plane of the groove in the longitudinal direction relative to which the lateral faces are substantially symmetrical. Other shape grooves disposed in a longitudinal direction other than a circumferential direction in the case of tubular parts or a direction along a straight line in the case of flat parts can of course be envisaged.

The groove can be filled with first and second nickel alloys as generally defined by the compositions given hereinabove, a single nickel alloy resistant to stress corrosion or stainless steel and nickel alloy.

The invention applies to jointing tubular parts other than a containment vessel connecting tubes and a pipe of the primary circuit of a nuclear reactor. In particular, the invention applies to jointing primary pipes to the connecting tubes of the water box of a steam generator and to jointing a pressuriser to a stainless steel expansion line.

What is claimed is:

1. A method of jointing by heterogeneous butt-welding a first part made of low alloy constructional steel and a second part made of austenitic stainless steel, said method comprising the steps of:
   (a) machining an end portion of each of said parts;
   (b) placing the machined end portions of said parts face-to-face to constitute a welding groove extending in a longitudinal direction between said parts and depositing a filler metal into said welding groove,
   wherein said welding groove is a narrow groove having a maximal width, in a direction perpendicular to a longitudinal direction of said groove and to the lateral walls, less than or equal to 15 mm, and lateral walls parallel to the longitudinal direction machined portions of said two parts which are substantially parallel to each other, said walls forming with a median plane of said groove an angle of 1°, said method comprising the further step of:

(c) depositing into said welding groove a filler alloy containing by weight 19% to 32% chromium and possibly iron, manganese, silicon, molybdenum, aluminum, copper, niobium and titanium, a remainder of said filler alloy, with the exception of impurities resulting from its manufacture, comprising nickel constituting at least 50% by weight.

2. The method according to claim 1, wherein said first part and said second part are of tubular shape, an annular welding groove having an axis coincident with the axis common to said first part and said second part which are placed end-to-end in a coaxial arrangement, comprising depositing one of a first nickel alloy and a stainless steel into a first part of said welding groove towards the inside or root of said parts and a second nickel alloy in a second part of the welding groove extending from the root towards the outside of said parts.

3. The method according to claim 2, wherein said first nickel alloy contains by weight less than 0.04% carbon, less than 0.015% sulfur and less than 0.015% phosphorus, 28% to 31.5% chromium, possibly 7% to 12% iron, less than 0.50% molybdenum, less than 1.10% aluminum, less than 0.30% copper, less than 1% titanium, the remainder of said first nickel alloy essentially consisting of nickel.

4. The method according to claim 2, comprising depositing in said first part of said welding groove a low carbon stainless steel containing approximately 17% chromium and approximately 12% nickel.

5. The method according to claim 2, wherein said second nickel alloy contains by weight less than 0.10% carbon, 18% to 22% chromium, less than 3% iron, less than 0.50% copper, possibly 2% to 3% niobium, less than 0.75% titanium and 2.50% to 3.50% manganese, less than 0.030% phosphorus, less than 0.015% sulfur and less than 0.50% silicon, the remainder essentially consisting of nickel constituting more than 67% by weight.

6. The method according to claim 3, wherein said second nickel alloy contains by weight less than 0.10% carbon, 18% to 22% chromium, less than 3% iron, less than 0.50% copper, possibly 2% to 3% niobium, less than 0.75% titanium and 2.50% to 3.50% manganese, less than 0.030% phosphorus, less than 0.015% sulfur and less than 0.50% silicon, the remainder essentially consisting of nickel constituting more than 67% by weight.

7. The method according to claim 4, wherein said second nickel alloy contains by weight less than 0.10% carbon, 18% to 22% chromium, less than 3% iron, less than 0.50% copper, possibly 2% to 3% niobium, less than 0.75% titanium and 2.50% to 3.50% manganese, less than 0.030% phosphorus, less than 0.015% sulfur and less than 0.50% silicon, the remainder essentially consisting of nickel constituting more than 67% by weight.

8. The method according to claim 1, wherein said filler metal is a single nickel alloy containing by weight less than 0.04% carbon, 28% to 31.5% chromium, possibly 7% to 12% iron, less than 0.5% molybdenum, less than 1.10% aluminum, less than 0.30% copper and less than 1% titanium, the remainder essentially consisting of nickel.

* * * * *